United States Patent [19]

Dennis et al.

[11] Patent Number: 5,458,211
[45] Date of Patent: Oct. 17, 1995

[54] SPADE DRILL BIT CONSTRUCTION

[76] Inventors: Thomas M. Dennis, 7519 Basswood Forest, Houston, Tex. 77095; Mark Hunt, 100 Hollow Tree La. #2070, Houston, Tex. 77090

[21] Appl. No.: 197,158

[22] Filed: Feb. 16, 1994

[51] Int. Cl.$^6$ ................................................ E21B 10/58
[52] U.S. Cl. .................... 175/428; 175/434; 51/293; 408/145; 408/221; 408/222; 451/48
[58] Field of Search .................. 175/397, 420.2, 175/428, 434; 408/221, 222, 145; 51/288, 293

[56] References Cited

U.S. PATENT DOCUMENTS

| | | | |
|---|---|---|---|
| 4,592,433 | 6/1986 | Dennis | 175/428 |
| 4,604,106 | 8/1986 | Hall et al. | 51/293 |
| 4,627,503 | 12/1986 | Horton | 175/420.2 |
| 5,137,398 | 8/1992 | Omori et al. | 175/420.2 X |
| 5,195,403 | 3/1993 | Sani et al. | 175/428 X |
| 5,273,557 | 12/1993 | Cerutti et al. | 51/293 |

FOREIGN PATENT DOCUMENTS

| | | | |
|---|---|---|---|
| 506238 | 9/1992 | European Pat. Off. . | |
| 177213 | 10/1983 | Japan | 408/144 |
| 2085769 | 5/1982 | United Kingdom | 408/144 |

*Primary Examiner*—Roger J. Schoeppel
*Attorney, Agent, or Firm*—Gunn & Associates

[57] ABSTRACT

A spade in a bit body is disclosed to have a planar body shaped with two intersecting cutting faces. The cutting faces extend to side faces defining spade width for cutting a hole to gauge. Inserts positioned in the body are at the corner of the spade. The inserts are formed of very hard material, and provide longer life.

7 Claims, 1 Drawing Sheet

SPADE DRILL BIT CONSTRUCTION

BACKGROUND OF THE DISCLOSURE

The present disclosure is directed to an improved drill bit which is adapted to be used in drilling in coal mines and other similar shaft mines. It also can be used in open pit mining in a fashion which will be set forth. Briefly, safety and security of a mine often requires that a number of relatively shallow holes of small diameter be drilled into the wall of the shaft. It is not uncommon to drill vertically in underground shafts up into the overburden as a preliminary step to anchoring shoring in the mine to enhance safety for the miners. In coal mines, this often requires drilling perhaps 4 feet with a drill bit to form a hole about 4 feet in depth which is subsequently provided with an anchor rod of about 1 to 3 inches in diameter. It is not uncommon to deplete a drill bit after only about 50 holes are drilled with the bit. The drill bit must then be discarded and a new drill bit used. The present disclosure sets forth an improved drill bit which is able to provide much greater life. A fair estimate is that the improved drill bit of the present disclosure can provide at least four times as many anchor holes in the typical coal mine compared with an old drill bit of construction in accordance with prevailing technologies heretofore.

The drill bit of the present disclosure is an improved spade drill bit. It has a support body mounted on a stem. The stem is suitably connected with a chuck and drive motor which imparts rotation. The stem connects to a drill bit body which is provided with a transverse groove. The body serves as a support and also an alignment guide for a spade which is positioned in the groove. The spade resembles a typical shovel and in that sense provides the nonmenclature for this type of drill bit. The spade shaped drill bit is constructed with a planar spade which is held in the transverse groove in the drill bit body. The spade is equipped with two side edges which provide the gauge measurement for the drilled hole. The spade is welded or brazed to the body of the drill bit and is aligned so that it is centralized on the body for easy control of the hole diameter. In addition to that, the spade is constructed with two generally planar faces which come to a point. The angle at the point is not sharp i.e. the included angle between the two faces defining the point is relatively large, about 120°–150°.

The two planar faces which come together at the point of the spade extend outwardly at the included angle and terminate at the gauge defining side faces. The side faces define a relatively sharp point with the exposed leading planar faces. The sharp point is able to cut material but most of the wear accumulates in the immediate vicinity of the corners at the side faces. They wear rapidly in comparison with other parts of the spade. This rapid wear is one source of destruction of the spade drill bit so that ultimate replacement is required. One aspect of the present invention is the incorporation of an insert which is joined to the spade to reinforce and make stronger the spade at that region so that the drill bit lasts much longer.

In one version of the present invention, a segment of a circular disk of polycrystalline diamond compact (hereinafter known as PCD) is inserted at the corner. The entire corner is therefore made of PCD material. This extends the life and maintains a true gauge cutter for much longer. In addition to that, an alternate embodiment utilizes PCD formed in the shape of a chevron which has an angle suitable for incorporation at the corner. By using this corner angle, the side faces can be clad with protective material, and this protective material can be extended along the exposed cutting faces. Again, this substantially extends the life of the device.

The spade as improved in accordance with the present disclosure is affixed to the drill bit body. The improved spade thus extends the life so that the user need not replace the drill bit as often. Moreover, because the improved spade with PCD is incorporated at both the cutting edges and on the side faces, a gauge hole is assured in ordinary operation.

SUMMARY OF THE DISCLOSURE

This disclosure is directed to a spade type drill bit which has a body, and the body supports a transverse groove across the body to receive a spade. The spade is symmetrically constructed with two cutting edges which come together at a point. The angle at the point is relatively shallow in most constructions. The two cutting edges extend radially outwardly to side faces. The typical spade is constructed with five sides, there being a back edge which is seated in the body to register the spade with respect to the centerline axis of the body. Moreover, the spade is constructed with PCD reinforcement located at the corner intersections of the side faces with the cutting faces.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAIL DESCRIPTION OF THE PREFERRED EMBODIMENT

Figure 1:
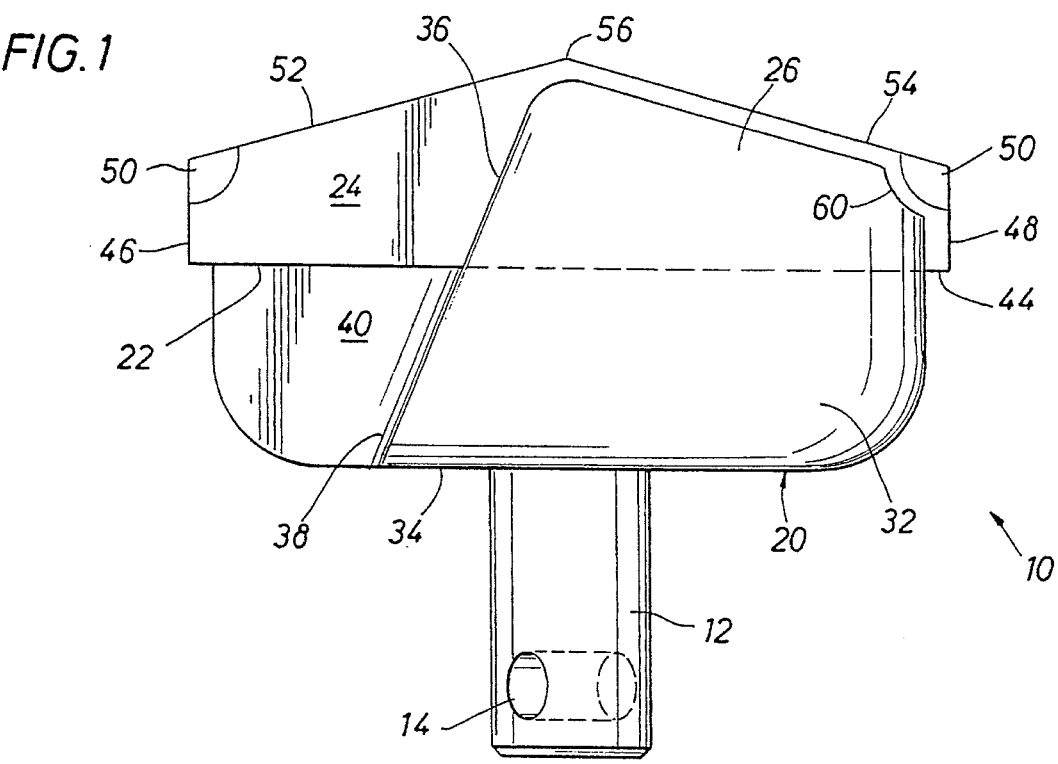
FIG. 1 is a side view of the spade drill bit of the present disclosure showing a spade which is mounted on a drill bit body and which has PCD cladding at corners of the spade.

Attention is now directed to FIG. 1 of the drawings where a spade drill bit is identified generally by the numeral 10. The spade drill bit is particularly constructed so that it is able to form holes in rock mining which are typically between one and two inches in diameter, and which are drilled into the rock for a depth of perhaps a few feet. This type drill bit is rotated by an industry standard chuck and drill motor which need not be detailed in this disclosure. Rather, the drill bit end is constructed with a lower shank 12 which is approximately square in cross sectional area which includes an alignment opening 14 for easy connection with the well known and standardized chuck mounting mechanism. The stem 12 has a length which is determined in part by the scale of the drill bit 10, but it can be any where from two inches or shorter depending on the stem required. A solid, single piece body 20 is integrally cast to form a monolithic body mask with the stem 12. This is relatively hard steel. It is preferable to use tool steel for this. One suitable material is 4340 steel. It is constructed with duplicate, symmetrically arranged protruding body portions as will be described which define a slot 22 which extends transversely of the body 20. The slot is incorporated to receive the spade insert generally identified at 24 in FIG. 1 of the drawings.

Figure 2:
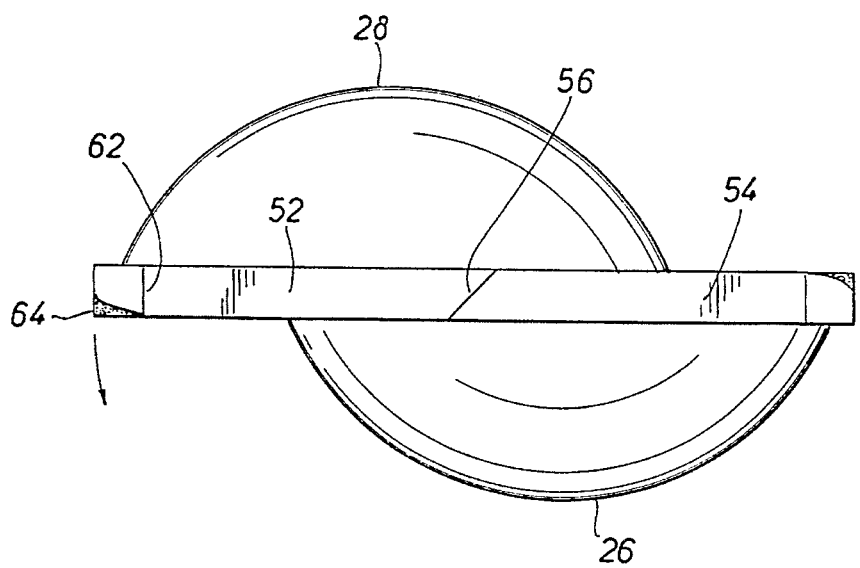
FIG. 2 is a top view of the spade shown in FIG. 1 showing how the body provides a transverse groove mounting the spade and provides bulk behind the spade with respect to the direction of rotation of the spade to thereby handle the stresses placed on the spade.

Going however to the body, this body 20 (typically a casting) has a front bulge 26 better shown in FIG. 2 of the drawings and an identical back bulge 28. The two bulges cooperate so that the spade receiving groove 22 is located between the two bulges. The bulges provides sufficient bulk and body so that the torque experienced by the spade during drilling is transferred into the large bulges. Because the body is an integral member formed of a single piece of steel, it is able to withstand substantial stresses. These stresses derive primarily from rotation of the drill bit and therefore require substantial weight of metal in the bulges 26 and 28. The body, considered in cross sectional view, is best observed in FIG. 2 of the drawings where the bulges define a generally thickened portion at the lower portion of the bulge 26, and the same is symmetrically true for the back bulge 28. The bulge 26 is constructed with a thickened lower portion 32 which is identified in FIG. 1 of the drawings. This lower portion provides substantial bulk to the body and extends below the recess slot 22. Indeed, the body is quite thick, the cross sectional view of FIG. 2 showing relative thickness which extends even to the bottom face 34 which fairs into the stem 12. The bottom face 34 has almost a rectangular shape. So to speak, the bottom face 34 is part of the body to enable the entire body to have the necessary strength so that torque during drilling is experienced as stress in the body but the stress level remains within acceptable, desired ranges. The bulk of the body is defined in the similar bulges 26 and 28. The curving face of the body bulge 26 is observed to terminate at an edge 36 above the slot 22. There is a gentle transition valley 38 below the edge 36. In the area of the valley 38, the curvature is gently changed so that an approximately planar face 40 is defined in that particular region. As will be understood, the same construction is applied to the opposite bulge.

Without the spade, the groove 22 provides an upstanding face width matching that of the spade 24 which is inserted. The insert 24, having the shape of a spade in the preferred version is rested on the groove face 22. The insert 24 is formed of tungsten carbide or some other hard material. Since it is the cutter in contact with the rock formations to be drilled, it is highly desirable that it be much harder than machine tool steel. In this instance, the preferred spade material is tungsten carbide. It is formed with a lower edge 44. It includes the side faces 46 and 48. The side faces 46 and 48 define the gauge of the drilled hole. The side faces 46 and 48 preferably are located equidistant with respect to the centerline axis of the tool so that both engage the side of the drilled hole and thereby maintain a true hole which is concentric with respect to the drill bit axis. The side faces 46 and 48 are parallel. They extend to cutting edges or faces 52 and 54. They come together at a central point 56. The shape of the point 56 will be reviewed below with respect to FIG. 2 of the drawings. It is important to note that the side faces 46 and 48 are protected at the top corners by the incorporation of a PCD insert 50. Similar inserts are provided at both corners of the spade. In this particular instance, the inserts are cut from a circular disk of PCD material. This disk defines the two inserts 50. In this version, the inserts 50 preferably have a thickness matching that of the spade 46 so that they extend from front to back, however, thinner inserts in the recess will also work. Moreover, the bulge 26 has been broken away at the upper corner 60 to enhance clarity of the drawing.

Going now to FIGS. 1 and 2 considered jointly, the insert 50 defines an edge 62. This edge is part of the cutting face 52. The cutting face is preferably formed of the same material which is in the spade 24, that being tungsten carbide in the preferred embodiment. Preferably, a modest chamfer 64 can be applied to the leading edge and corner of the apparatus to prevent premature chipping. Wear normally accumulates in the worst circumstances at this corner first and the chamfer can be formed during use even if it is not provided at the time of fabrication, if chipping has not caused excessive damage. Needless to say, this is symmetrically true for the opposite end of the spade. The face 52 and the face 54 on the opposite cutting edge of the spade come together at the region 56. The two planes which defines the faces 52 and 54 technically or geometrically intersect at a single line which is shown in FIG. 1 of the drawings. In actuality, it is preferable that there be a modest smoothing of the sharp edge 56 so that it is more in the form of a crown. This crown is something of a crowned region which it is not a sharp edge. Rather it has a small radius of curvature. Furthermore, the plan view of FIG. 2 shows that the edge 56 is an angled curving crown which takes into account the rotation of the spade bit in operation.

Figure 3:
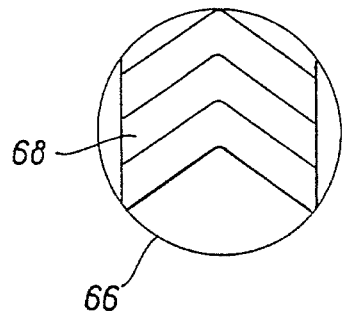
FIG. 3 is a view of a disk of PCD material which is cut in chevron shape to provide inserts suitable for the corners of the spade to thereby assure longer life in operation.
Figure 4:
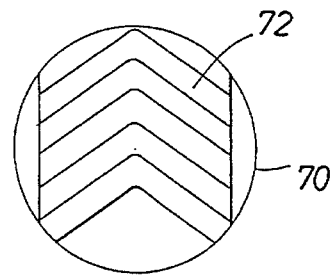
FIG. 4 is a view of a similar PCD disk which has been cut into smaller chevrons for installation on the spade.

The inserts 50 are formed from a circular PCD disk. The diameter of the disk is typically in the range of about ½ inch. This enables the sides of the PCD disk which actually contact during drilling to form a cladding of about ¼ inch on both edges. An alternate embodiment is set forth in FIG. 3 of the drawings. FIG. 3 shows a disk 66 of PCD materials. The PCD disk 66 is cut into several chevrons, one chevron being identified at 68. The angle of the chevron accommodates the angle at the corner of the spade. The chevron 68 is thus attached into the spade body 24 in lieu of the disk 50 which is formed of circular PCD disk stock. As before, the disk 66 has a thickness which matches the thickness of the spade, but it may be somewhat thinner. FIG. 4 shows another embodiment of the disk 70 and which includes additional chevrons 72. They are cut to a different angle to provide a different thickness of PCD material. The chevrons are thinner as will be observed on comparing FIG. 4 with FIG. 3. In both instances, the chevrons inscribe at an angle of approximately 110°. In both instances, the included angle matches the angle at the corner of the spade 24. If a different angle is required, the angle must be cut in the chevron.

The chevron inserts, as well as the circular segment inserts 50, are attached by brazing to the tungsten carbide material. It is most helpful that the body of the carbide spade provide backing to the PCD inserts as shown in FIG. 1 of the drawings where the body has been broken away at 60. This assures that the insert 50 is brazed on the spade 24 but it is also backed by the body of the drill bit or the carbide insert. This provides support or backing, thereby assuring that the PCD spade is not chipped or broken away which might occur with failure at the braze interface to the spade.

The manner of attachment of the circular segment insert 50 or the chevron type inserts 68 and 72 is preferably the same brazing. Brazing also is used in attaching the spade to the drill bit 10. In other words, the spade 24 is a separate unit which is fabricated with the PCD cladding at the corners. Then, the spade is joined to the body by resting in the slot 22. The spade 24 is held fast by brazing the spade along the groove 22 and also to the contacted faces with the bulges 26 and 28. Even should excessive braze material be used, overflow does not pose a problem.

In operation, wear is focused at the side faces 46 and 48 and particularly at the juncture with the cutting faces 52 and 54. All that wear is directed against surfaces which are clad with the PCD material. Durability and resistance against shock are markedly enhanced. Life in actual operation is enhanced by several fold. This enables the device to last much longer. In summary, the foregoing disclosure sets forth the preferred embodiment of the present invention but the scope of the invention is defined by the claims which follow.

We claim:

1. A spade type drill bit for drilling holes in hard rock with diameters up to about three inches, the drill bit comprising:

a) a drill bit body having a lower groove end and a stem end, the groove end having a transverse diametrically directed groove located therein wherein the groove is immediately adjacent to integral front and back body protuberance portions defining bulging-abutting sides to the groove and the stem end having a stem for attaching the drill bit body to a drilling mechanism for drilling in hard rock wherein the diameter of the stem is smaller than the diameter of a hole drilled by the drill bit;

b) a spade fitting in the groove and extending beyond the longitudinal extremities of the lower end of the front and back body protuberance portions, the spade provided with spaced side faces for cutting a gauge hole, the spade having a planar body terminating at intersecting bottom and side cutting faces which contact against rock when drilling a hole, the side cutting faces comprising leading and trailing spaced apart spade corners wherein a leading edge including the leading corner is chamfered, said body protuberance portions extending transversely so as to provide additional backing to said spade at a trailing edge of each side cutting face of said spade that reinforce said spade so that, during drilling, transfers load to said body and enables said body to avoid contact with the wall of the hole at the gauge diameter; and c) at least one PCD insert forming the spade corners wherein said spade and not said body cuts to gauge diameter.

2. The apparatus of claim 1 wherein two PCD inserts are positioned at the cutting faces of the spade type drill bit.

3. The apparatus of claim 1 wherein two separate inserts formed from a circular disk are positioned at the side faces of the spade.

4. The apparatus of claim 3 wherein the PCD material extends along the cutting faces.

5. The apparatus of claim 1 wherein the spade includes first and second spaced apart corners formed by at least the PCD inserts which are secured into the spade body by brazing and which are a portion of a PCD disk.

6. The apparatus of claim 1 wherein the PCD material is a portion of a PCD disk having a thickness approximately corresponding to a thickness of the spade.

7. The apparatus of claim 1 wherein the PCD material is a chevron having a thickness approximately corresponding to a thickness of the spade.

* * * * *